June 21, 1932.  O. MULLER  1,864,089
SPRING SUSPENSION FOR VEHICLES
Original Filed April 28, 1928   2 Sheets-Sheet 1
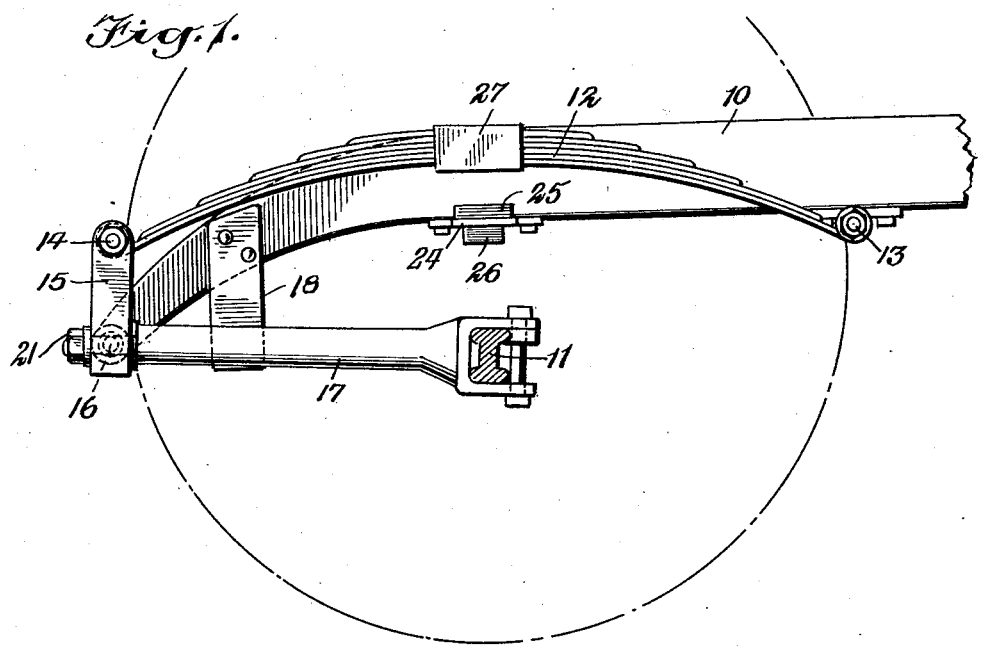
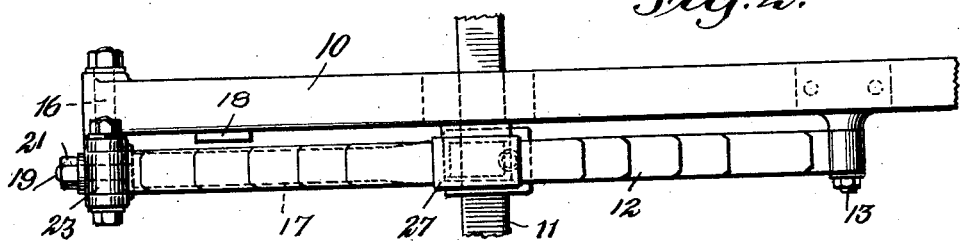
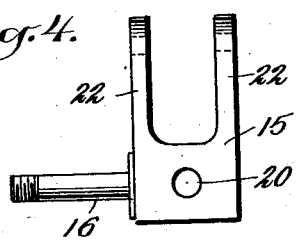
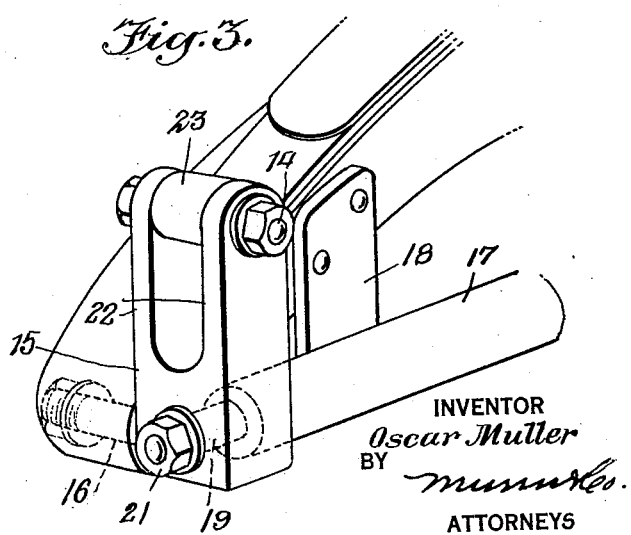
INVENTOR
Oscar Muller
BY
ATTORNEYS
WITNESSES June 21, 1932.  O. MULLER  1,864,089
SPRING SUSPENSION FOR VEHICLES
Original Filed April 28, 1928   2 Sheets-Sheet 2
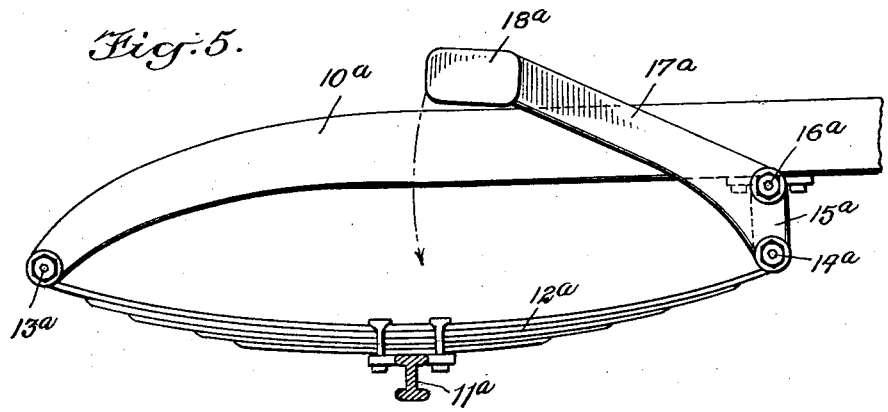
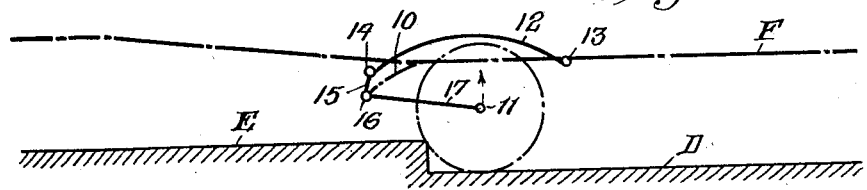
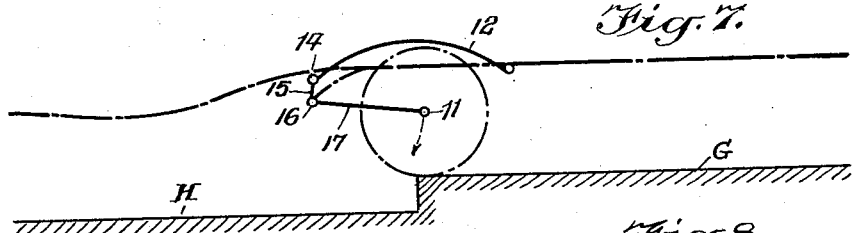
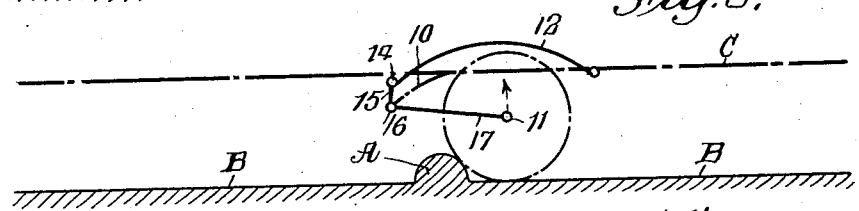
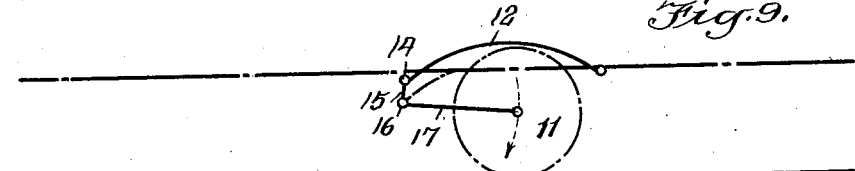
INVENTOR
Oscar Muller
BY
ATTORNEYS
WITNESSES Patented June 21, 1932

1,864,089

UNITED STATES PATENT OFFICE

OSCAR MULLER, OF HEMPSTEAD, NEW YORK

SPRING SUSPENSION FOR VEHICLES

Application filed April 28, 1928, Serial No. 273,632. Renewed November 9, 1931.

This invention relates to vehicles, and has particular reference to an improved spring suspension for connecting and supporting the body of the vehicle from the axles for the purpose of reducing road shocks.

It is common knowledge that the shocks and jars transmitted to the vehicle body and its occupants are due mainly to the reflex action of the springs or the "rebound" and various attachments or accessories, such as shock absorbers, snubbers or the like, have been devised and are now in general use for controlling this reflex action or rebound. While these devices have to some extent, accomplished their purpose, they are, nevertheless, open to certain objections and possess certain disadvantages, notably, the action which takes place when the wheels drop from an elevated surface onto a depressed surface of long or short duration, in which instances the frame is pulled or dragged downwardly with the wheels, tending to increase rather than decrease the shock transmitted to the body.

It is, therefore, one of the principal objects of the present invention to provide an improved spring suspension means which inherently functions to accelerate the deflection of the spring and to retard the reflex action thereof, in such a manner as to minimize the shocks and jars incident to "bumps", depressions or obstructions encountered on the road surface.

More specifically, the invention comprehends an improved spring suspension for vehicles including a lever as a component part thereof for effecting acceleration of the spring deflection and the retarding of the reflex action thereof, by virtue of which the wheels will move up and down with respect to the chassis frame to follow elevations or bumps or depressions with sufficient rapidity as to substantially unaffect the plane of movement of the chassis frame and body.

As a further object, the invention comprehends an improved spring suspension for wheeled vehicles including as a component part thereof a lever connection between the spring and the axle by virtue of which, the reduction of the working force necessary to flex the spring from its normal position by relative movement of the axle with respect to the frame, is obtained and by means of which the reflex action of the spring inversely applied to the lever as a working force retards said reflex action whereby the rebound is distributed over a greater period of time to reduce the shock incident thereto.

Other objects of the invention reside in the comparative simplicity of construction of the invention, the economy with which it may be produced and installed and the general efficiency derived therefrom.

With the above recited and other objects in view, reference is had to the following description and accompanying drawings, in which there is exhibited one example or embodiment of the invention, while the claim defines the actual scope of the same.

In the drawings:

Figure 1 is a fragmentary view illustrating a vehicle equipped with a spring suspension constructed in accordance with one form of the invention.

Figure 2 is a fragmentary top plan view thereof.

Figure 3 is a fragmentary perspective view on an enlarged scale.

Figure 4 is a detail front view of one of the lever arms.

Figure 5 is a view similar to Figure 1 illustrating a modified adaptation of the invention.

Figures 6, 7, 8 and 9 are diagrammatic views illustrating the action of the suspension means under varying conditions.

Referring to the drawings by characters of reference, and particularly to the preferred form of the invention illustrated in Figures 1 to 4, inclusive, 10 designates the chassis frame, 11 the axle and 12 a leaf spring of the ordinary multiple leaf semi-elliptic type. The spring 12 has one of its ends anchored at 13 to the chassis frame 10, while the opposite end is connected at 14 to the short lever arm 15 of a bell crank lever which is fulcrumed at 16 to the chassis frame. The remaining longer arm 17 of the bell crank lever has its free terminal secured to the axle 11.

Under this construction and arrangement, when the wheels strike an elevated obstruction or "bump" A on the road surface, the axle 11 moving upwardly toward the chassis applies a working force to the free end of the longer arm 17 of the bell crank lever. Obviously, this deflects the spring from its normal position by virtue of a pulling force exerted thereon in contra-distinction to a lifting force, and due to the increased leverage encounters little resistance in the deflection of the spring. If the obstruction or "bump" A is of short duration, as illustrated in Figure 8, the wheel immediately drops back to the normal level or road surface B as soon as it passes over the bump or obstruction assisted by the reflex action of the spring. It is thus apparent that the plane of travel C of the chassis frame and body of the vehicle is not materially altered and that the shock incident to encountering the obstruction or bump is wholly absorbed or taken care of without being transmitted to the frame, body or occupants of the vehicle. When the vehicle moves from a lower road surface D to a higher one E of considerable duration, as illustrated in Figure 6, the axle 11 moves upwardly toward the chassis and applies a working force to the free end of the long arm 17 of the bell crank lever and due to the increased leverage encounters little resistance in moving the spring to a deflected position. Obviously, the spring deflection is caused by a pulling force rather than a lifting force, as is common with the ordinary forms of spring suspension. When the wheels reach the top of the elevated section or surface E, the reflex action of the spring in returning to its normal condition applies a working force to the short arm 15 of the lever to move the chassis which is supported at the lever fulcrum, upwardly with respect to the axle. This retards the speed of the reflex action due to the decreased leverage encountered and distributes the rebound over a greater period of time or distance so that the movement of the chassis frame and body of the vehicle to a normal position with respect to the road surface is gradually accomplished, as illustrated by the line of travel F, thereby rendering the shock which would otherwise be sudden, practically unnoticeable to the occupants.

When the vehicle passes over an elevated road surface G and onto a depressed road surface H of considerable duration, as illustrated in Figure 7, the suspension means acts in the following manner: As the wheels leave the elevated surface G, they drop and move forwardly, assisted by the reflex action of the spring 12, onto the depressed surface H and move the axle 11 downwardly relatively to the chassis frame 10. It is obvious that the weight of the vehicle which is impinged on the fulcrum point 16 receives greater resistance or support than normal due to the fact that the axle 11 is disposed closer under the fulcrum point 16 and that the long arm 17 is forced to exert a pull against a reflex position of the spring in moving back to normal position. Due to this retarded movement, the chassis is retarded in returning to its relatively normal position or moving downwardly gradually to a point slightly below its normal position and returning gradually to the normal position relative to the road surface, the rebound will be practically unnoticeable to the occupants of the vehicle.

The suspension means operates in the following manner when the wheels encounter the depression I of short duration, as illustrated in Figure 9, the action being substantially reverse of that described for Figure 8. When the wheels drop into a depression illustrated at I in Figure 9, assisted by the reflex action of the spring 12, the axle 11 moves downwardly and forwardly, retarding the downward movement of the chassis frame 10, it being thereby obvious that the lever 17 will find little or no resistance in returning to its normal position so that the level or plane of travel of the vehicle body and frame will be practically undisturbed by a depression of short duration.

In order to eliminate lateral movement or sway between the axle and the chassis frame, depending brace lugs 18 are provided on the chassis frame which are disposed alongside of and approximately in contact with the inside of the long arms 17 of the levers which obviously are installed on opposite sides of the chassis frame. In order to compensate for lateral canting of the axle where the obstruction or depression only affects one wheel, the long arms 17 of the bell crank levers are swiveled to the short arms 15, this being accomplished by forming the longer arms with reduced extremities 19 which extend through bearing openings 20 in the shorter arms 15, a suitable nut 21 being engaged over the reduced extremity after its passage through the opening. As illustrated in the drawings, the short arm 15 is provided with a laterally projecting stud bolt 16 constituting the fulcrum for the bell crank lever. The short arm 15 is preferably bifurcated and the transversely spaced furcations 22 thereof receive the connecting bolt 14 which passes through the usual eye 23 in the spring terminal and through the furcations 22. If desired, the chassis frame may have attached thereto a bracket 24 which carries on its upper and lower sides cushion elements 25 and 26 adapted to respectively coact with the spring clip plate 27 of the spring and with the axle 11 where extreme deflection of the spring is met with or should the spring 12 be broken.

In the modified form of the invention illustrated in Figure 5, the semi-elliptic spring 12a is anchored at 13a to the chassis frame 10a at one extremity of the spring and the opposite extremity is connected at 14a to the short arm 15a of a bell crank lever which is fulcrumed at 16a to the chassis frame. In this instance, the axle 11a is disposed under the center of the spring 12a and is suitably connected therewith. The long arm 17a of the bell crank lever is provided with a weight 18a. In use, the function or purpose is identical with that of the preferred form while in operation the weight 18a serves to assist the deflection of the spring 12a while accelerating its action. The reflex action of the spring is controlled and retarded as the spring applies a working force to the point 14a through the short arm of the lever 15a to lift the weight 18a at the free end of the long arm 17a.

What is claimed is:

In a spring suspension for vehicles including a chassis frame, an axle underlying the same and supporting wheels carried by the axle, a lever fulcrumed to the chassis frame intermediate its ends to provide a long lever arm attached to the axle and a short lever arm and a normally bowed spring anchored at one end to the chassis frame and secured at its opposite end to the free end of the short lever arm whereby upon relative movement of the chassis frame and axle toward each other the spring is deflected and straightened while relative movement of the same away from each other under the reflex action of the spring is retarded and means on the chassis frame extending alongside of said longer lever arm for guiding the same in its movements.

Signed at New York, in the county of New York and State of New York, this 26th day of April, A. D., 1928.

OSCAR MULLER.